United States Patent [19]
Hoglund

[11] Patent Number: 6,021,708
[45] Date of Patent: Feb. 8, 2000

[54] SPIT RISER MOUNT

[76] Inventor: Le Roy Hoglund, 6419 W. Green Acres St., Homosassa, Fla. 34446

[21] Appl. No.: 09/258,325

[22] Filed: Feb. 25, 1999

[51] Int. Cl.[7] .............................. A47J 37/00; A47J 37/04; F24B 3/00

[52] U.S. Cl. ........................... 99/421 H; 99/419; 99/449; 126/9 R; 126/41 R

[58] Field of Search ................ 99/339, 340, 419–421 V, 99/426, 446–450, 482, 516; 126/25 R, 9 R, 41 R

[56] References Cited

U.S. PATENT DOCUMENTS

| | | | |
|---|---|---|---|
| 2,580,549 | 1/1952 | Jacobson | 99/421 H |
| 3,240,147 | 3/1966 | Farber et al. | 99/446 |
| 3,248,518 | 4/1966 | Ogle, Jr. et al. | 99/446 X |
| 3,254,591 | 6/1966 | Cohen et al. | 99/446 X |
| 3,297,166 | 1/1967 | Summers | 99/421 H |
| 3,356,012 | 12/1967 | Rosen | 99/446 |
| 4,598,690 | 7/1986 | Hsu | 126/25 R |
| 4,770,091 | 9/1988 | Vaughn | 99/449 X |
| 5,007,403 | 4/1991 | Chen | 126/25 R |
| 5,172,628 | 12/1992 | Pillsbury et al. | 99/419 X |
| 5,632,098 | 5/1997 | Finch | 99/421 H |
| 5,715,744 | 2/1998 | Coutant | 99/419 X |
| 5,755,153 | 5/1998 | Su | 99/426 X |
| 5,782,168 | 7/1998 | Krhnak | 99/340 |
| 5,832,811 | 11/1998 | King | 99/516 X |
| 5,837,980 | 11/1998 | Henning | 99/421 H |

Primary Examiner—Timothy Simone

[57] ABSTRACT

A spit riser mount for mounting a rotating spit to a tabletop grill. The spit riser mount includes an annular spit mount that has a plurality of pieces. Each of the pieces has opposite first and second ends. The first end of a piece removably engages the second end of an adjacent piece. A first of the pieces has a slot downwardly extending from an upper edge of the piece. The slot is adapted for receiving a spit therein. A second of the pieces has a first aperture positioned towards its upper edge. The first aperture is adapted for receiving a spit therethrough.

13 Claims, 3 Drawing Sheets

SPIT RISER MOUNT

BACKGROUND OF THE INVENTION

1. Field of the Invention

The present invention relates to rotisserie mounts and more particularly pertains to a new spit riser mount for mounting an electric spit to a tabletop grill.

2. Description of the Prior Art

The use of rotisserie mounts is known in the prior art. More specifically, rotisserie mounts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,649,475; 5,715,744; 5,172,628; 5,001,971; U.S. Pat. No. Des. 145,601; and U.S. Pat. No. 2,580,549.

While these devices fulfill their respective, particular objectives and requirements, the aforementioned patents do not disclose a new spit riser mount. The inventive device includes an annular spit mount that has a plurality of pieces. Each of the pieces has opposite first and second ends. The first end of a piece removably engages the second end of an adjacent piece. A first of the pieces has a slot downwardly extending from an upper edge of the piece. The slot is adapted for receiving a spit therein. A second of the pieces has a first aperture positioned towards its upper edge. The first aperture is adapted for receiving a spit therethrough.

In these respects, the spit riser mount according to the present invention substantially departs from the conventional concepts and designs of the prior art, and in so doing provides an apparatus primarily developed for the purpose of mounting a spit to a tabletop grill.

SUMMARY OF THE INVENTION

In view of the foregoing disadvantages inherent in the known types of rotisserie mounts now present in the prior art, the present invention provides a new spit riser mount construction wherein the same can be utilized for mounting a spit to a tabletop grill.

The general purpose of the present invention, which will be described subsequently in greater detail, is to provide a new spit riser mount apparatus and method which has many of the advantages of the rotisserie mounts mentioned heretofore and many novel features that result in a new spit riser mount which is not anticipated, rendered obvious, suggested, or even implied by any of the prior art rotisserie mounts, either alone or in any combination thereof.

To attain this, the present invention generally comprises an annular spit mount that has a plurality of pieces. Each of the pieces has opposite first and second ends. The first end of a piece removably engages the second end of an adjacent piece. A first of the pieces has a slot downwardly extending from an upper edge of the piece. The slot is adapted for receiving a spit therein. A second of the pieces has a first aperture positioned towards its upper edge. The first aperture is adapted for receiving a spit therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new spit riser mount apparatus and method which has many of the advantages of the rotisserie mounts mentioned heretofore and many novel features that result in a new spit riser mount which is not anticipated, rendered obvious, suggested, or even implied by any of the prior art rotisserie mounts, either alone or in any combination thereof.

It is another object of the present invention to provide a new spit riser mount which may be easily and efficiently manufactured and marketed.

It is a further object of the present invention to provide a new spit riser mount which is of a durable and reliable construction.

An even further object of the present invention is to provide a new spit riser mount which is susceptible of a low cost of manufacture with regard to both materials and labor, and which accordingly is then susceptible of low prices of sale to the consuming public, thereby making such spit riser mount economically available to the buying public.

Still yet another object of the present invention is to provide a new spit riser mount which provides in the apparatuses and methods of the prior art some of the advantages thereof, while simultaneously overcoming some of the disadvantages normally associated therewith.

Still another object of the present invention is to provide a new spit riser mount for mounting a spit to a tabletop grill.

Yet another object of the present invention is to provide a new spit riser mount which includes an annular spit mount that has a plurality of pieces. Each of the pieces has opposite first and second ends. The first end of a piece removably engages the second end of an adjacent piece. A first of the pieces has a slot downwardly extending from an upper edge of the piece. The slot is adapted for receiving a spit therein. A second of the pieces has a first aperture positioned towards its upper edge. The first aperture is adapted for receiving a spit therethrough.

Still yet another object of the present invention is to provide a new spit riser mount that disassembles quickly into four pieces that stack together for convenient transportation.

Even still another object of the present invention is to provide a new spit riser mount that overcomes the disadvantage common with tabletop grills—burning of food. Since the flame is so close to the grate, food resting on the grate is more likely to burn and is more susceptible to "hot spots" where hot air becomes concentrated as it passes through a passage between the lava rocks or other heat dispersion means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
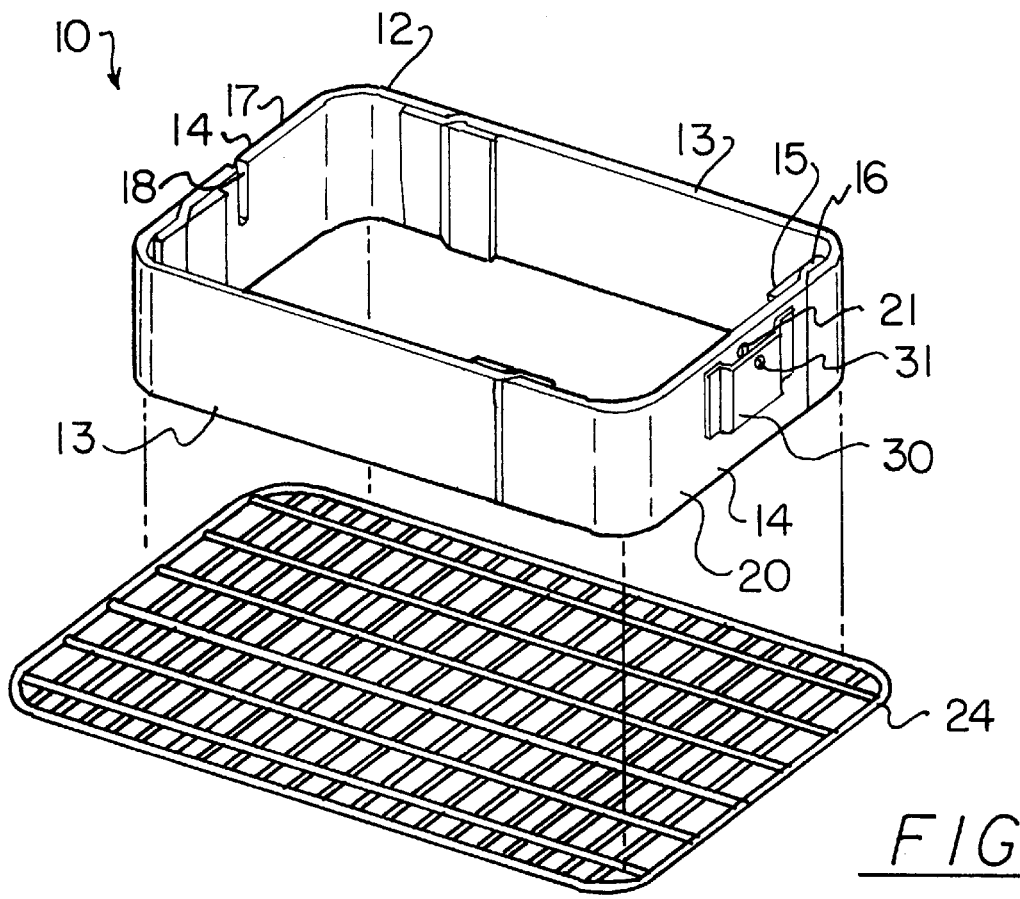
FIG. 1 is a schematic perspective view of a new spit riser mount according to the present invention.
Figure 2:
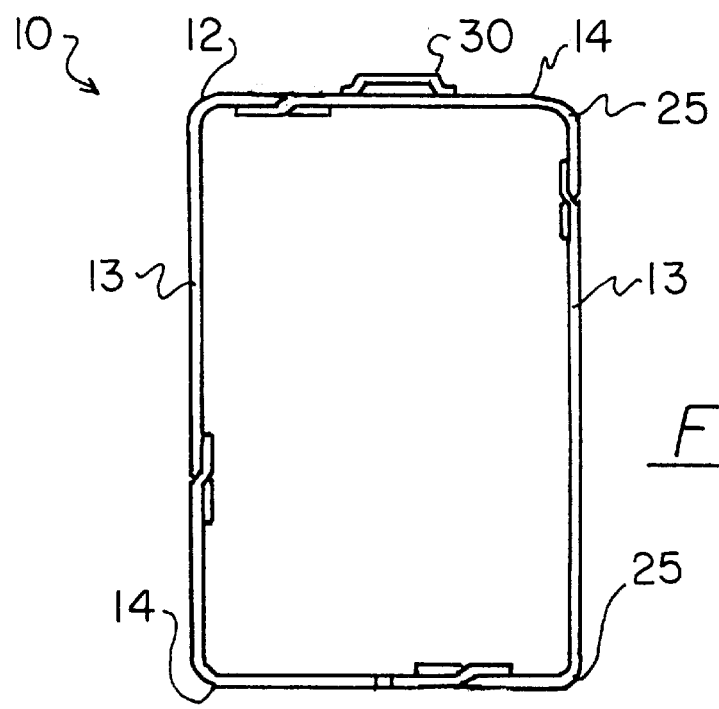
FIG. 2 is a schematic side view of the present invention.
Figure 3:
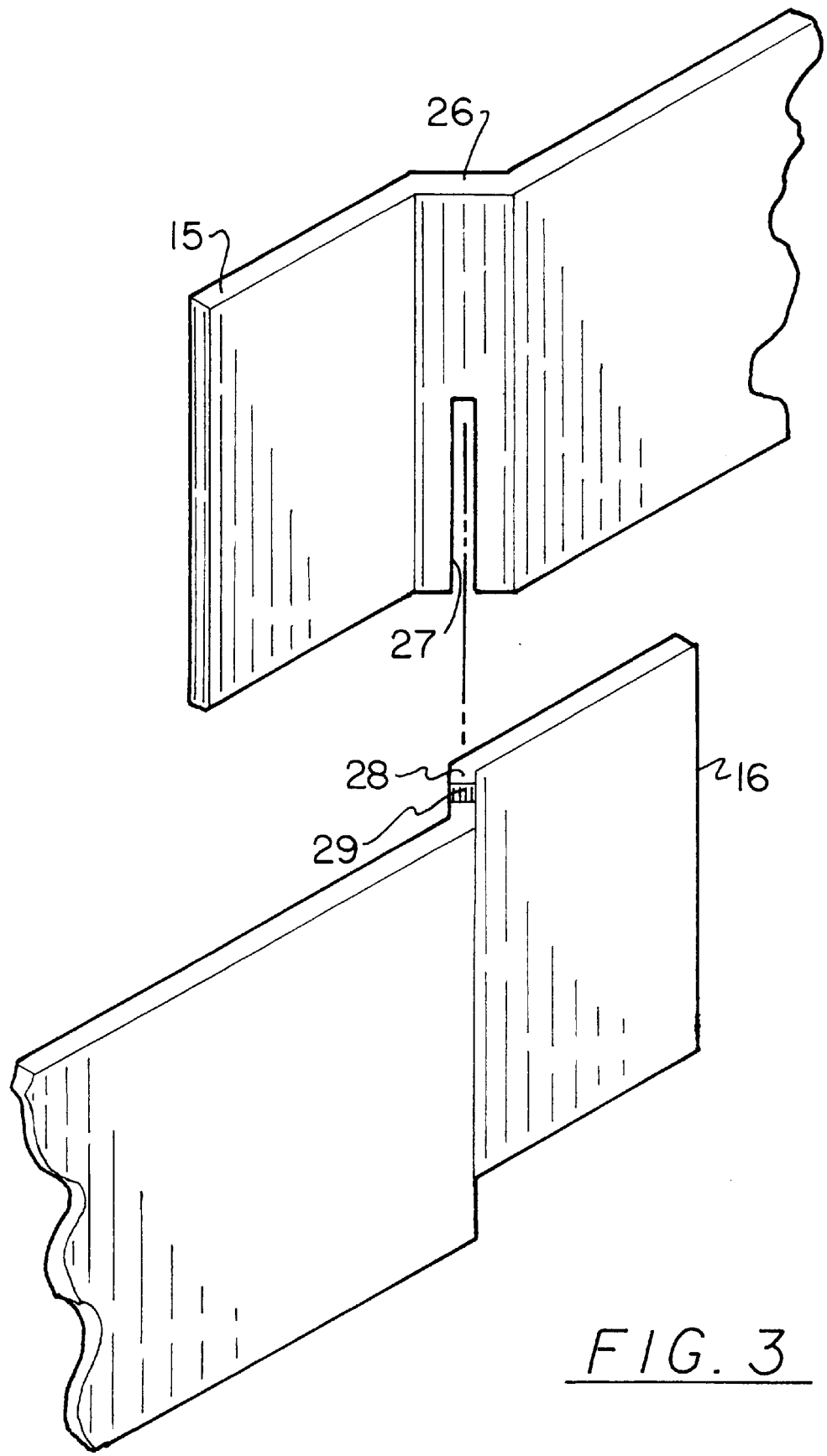
FIG. 3 is a schematic detailed view of the present invention illustrating how the invention is assembled and disassembled.

With reference now to the drawings, and in particular to FIGS. 1 through 4 thereof, a new spit riser mount embodying the principles and concepts of the present invention and generally designated by the reference numeral 10 will be described.

As best illustrated in FIGS. 1 through 4, the spit riser mount 10 generally comprises an annular spit mount 12 that has a plurality of pieces 13,14. Each of the pieces has opposite first and second ends 15,16. The first end of a piece removably engages the second end of an adjacent piece. A first of the pieces 17 has a slot 18 downwardly extending from an upper edge of the piece. The slot is adapted for receiving a spit 19 therein. A second of the pieces 20 has a first aperture 21 positioned towards its upper edge. The first aperture is adapted for receiving the spit therethrough.

Figure 4:
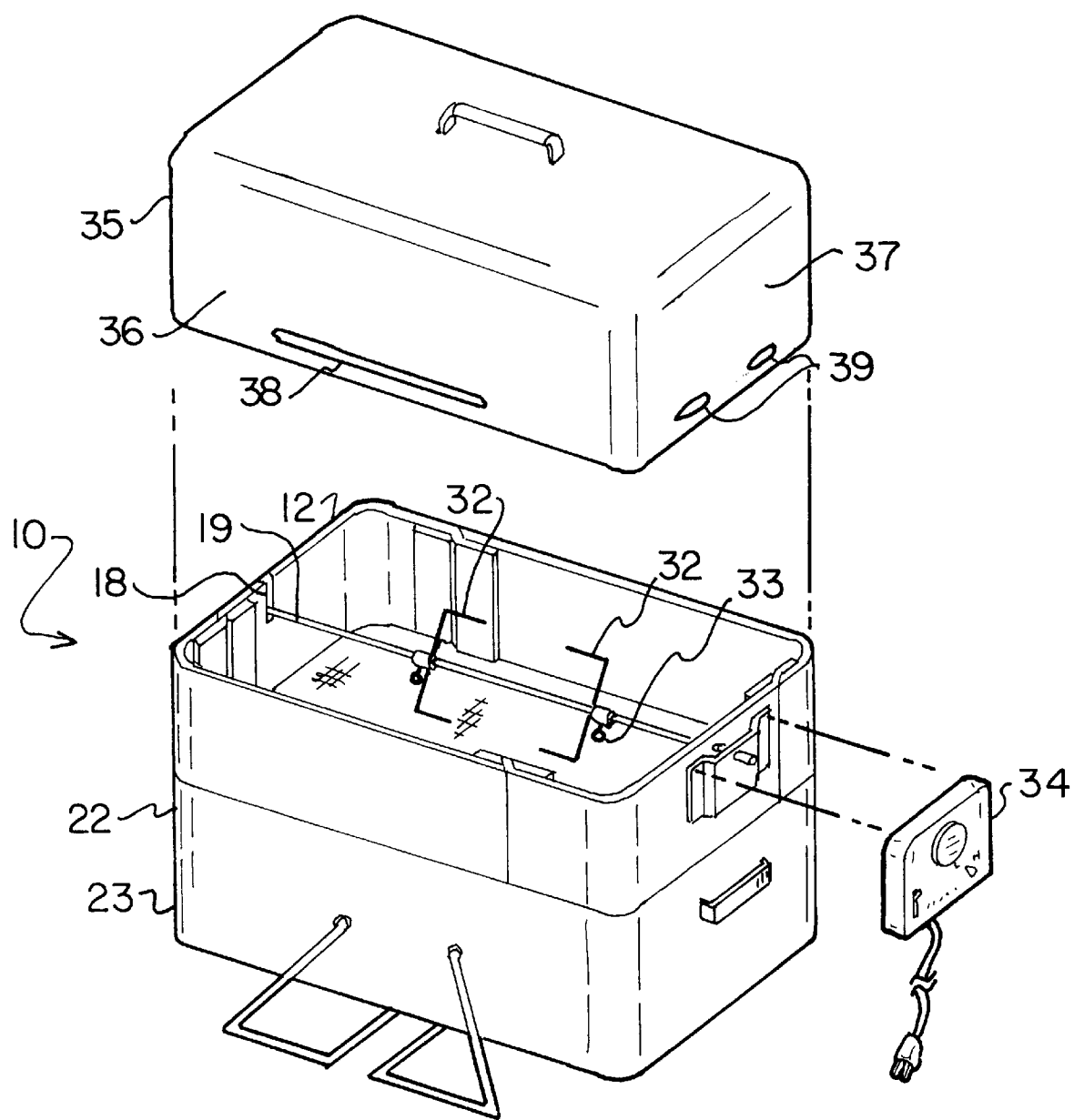
FIG. 4 is a schematic perspective view of the present invention.

In more detail, as shown in FIG. 4, it is seen that the spit mount is designed to mount to a grill 22 of the portable type that is fueled by small gas bottles, charcoal, or an electric heating element. The grill comprises a lower housing 23 and a cooking grate 24 disposed on the lower housing.

Preferably, the annular spit mount has a pair of long pieces 13 and a pair of short pieces 14 positioned between the long pieces. Each of the pieces has opposite first and second ends. Ideally, each of the pieces has a bend portion 25 positioned between the first and second ends such that the first and second ends of a particular piece are positioned at about a 90 degree angle from each other. The first end of a piece removably engages the second end of an adjacent piece. Exemplary dimensions of a spit mount mountable to a typical portable grill are 17⅜ inches long by 10⅝ inches wide by 5½ inches high.

Ideally, each of the bend portions is curved to generally match the curvature of the outer edge of the grill. This prevents heat loss by matching the contours of the lower housing and the lid, which can be placed on top of the spit mount.

Preferably, each of the pieces has a first angled portion 26 positioned towards the first end thereof that angles inward of the piece. Each of the first angled portions has a slot 27 extending upwardly therealong. Each of the pieces has a second angled portion 28 positioned towards the second end thereof and angling inward of the piece. The second angled portions each have a slot 29 extending downwardly therealong that are adapted for receiving the first angled portion therein.

Ideally, the first and second ends of each of the pieces are positioned inside the spit mount so that the outer edge of the spit mount rests snugly along the upper rim of the lower housing of the grill with no gaps that would leak warm or cold air.

A first of the short pieces has a slot downwardly extending from an upper edge of the short piece. The slot is adapted for receiving a spit therein. A second of the short pieces has a first aperture positioned towards an upper edge thereof and a holed mounting wall 30 with a hole 31 substantially aligned with the first aperture. A spit is inserted through the first aperture and the hole of the second of the short pieces and resting in the slot of the first of the short pieces.

A pair of forks 32 may be coupled to the spit for coupling food to the spit. If used, the forks are ideally selectively positionable along the spit. The forks may each have a wing bolt 33 that, when loosened, permits the forks to slide along the spit. When tightened, the wing bolts frictionally prevent the forks from sliding.

Preferably, a motor 34 rotates the spit. The motor is mounted to the mounting wall of the second of the short pieces and is in communication with the spit. Ideally, the motor has two rotational speeds. One of the speeds is about 1½ times as fast as the other of the rotational speeds. Two speeds are necessary because many portable grills are unpredictable in their heat output and where "hot spots" will appear. The slower speed is used if the grill is operating satisfactorily. The faster speed is used if the grill is not performing optimally and the slow rotational speed is causing the food to burn or cook to quickly on the outside.

A lid 35 may rest on the spit mount. The preferred lid has long sides 36 and short sides 37. Ideally, the lid has a pair of side vent slots 38 positioned on the long sides of the lid towards a lower periphery of the lid. The lid should also have two pairs of end vent slots 39. A pair of end slots is positioned on each short side of the lid towards the lower periphery of the lid in a spaced apart configuration. This strategic placement of the vent slots causes the heated air inside the grill to swirl in a mushroom-like manner that concentrates the heat on the food. The heated air rises from the burner, coals, or element and flows around food on the spit. Then, reaching the ceiling, the heated air flows downward along the sides of the lid and out of the vent slots. The side slots are spaced apart for safety. The hot air flowing out of them does not directly flow onto the spit or motor, which a cook could accidentally grab and burn his or her hand.

In use, the lid is taken off of the grill housing and the spit mount is rested on the outer periphery of the grill for a form-fitting model, or rested on the grate of the grill for a non form-fitting model. The motor is mounted to the mounting wall. Food is placed on the spit and the forks are pushed towards each other until they pierce the food and are then locked in place. One end of the spit is inserted into the hole and first aperture of the second of the short pieces and into the motor. The other end of the spit is inserted in the slot of the first of the short pieces. The heat source is started. The motor is turned on and the desired speed selected. The lid is placed on the spit mount.

After use, the spit mount may be disassembled for convenient storage. The pieces slide apart by pulling them apart such that the first angled portions slide out of the slots of the second angled portions, and vice versa. The pieces may then be stacked together, placing all of the bend portions adjacent to each other.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grill attachment for supporting a spit, the attachment comprising:
    an annular spit mount having a plurality of pieces, each of said pieces having opposite first and second ends, said first end of a piece removably engaging said second end of an adjacent piece;
    a first of said pieces having a slot downwardly extending from an upper edge of said piece said slot being adapted for receiving a spit therein;
    a second of said pieces having a first aperture positioned towards an upper edge thereof, said first aperture being adapted for receiving a spit therethrough; and
    wherein each of said pieces has a first angled portion positioned towards said first end thereof and angling inward of said piece, said first angled portions each having a slot extending upwardly therealong, each of said pieces having a second angled portion positioned towards said second end thereof and angling inward of said piece, said second angled portions each having a slot extending downwardly therealong and adapted for receiving said first angled portion therein.

2. The attachment of claim 1, wherein each of said pieces has a bend portion positioned between said first and second ends such that said first and second ends of a particular piece are positioned at about a 90 degree angle from each other.

3. The attachment of claim 2, wherein each of said bend portions is curved.

4. The attachment of claim 1, wherein said second of said pieces has a holed mounting wall having a hole substantially aligned with said first aperture.

5. The attachment of claim 1, further comprising a spit being inserted through said first aperture of said second of said pieces and resting in said slot of said first of said pieces.

6. A grill attachment for supporting a spit, the attachment comprising:
    an annular spit mount having a plurality of pieces, each of said pieces having opposite first and second ends, said first end of a piece removably engaging said second end of an adjacent piece;
    a first of said pieces having a slot downwardly extending from an upper edge of said piece said slot being adapted for receiving a spit therein;
    a second of said pieces having a first aperture positioned towards an upper edge thereof, said first aperture being adapted for receiving a spit therethrough;
    wherein said second of said pieces has a holed mounting wall having a hole substantially aligned with said first aperture; and
    a motor for rotating a spit, said motor being mounted to said mounting wall of said second of said short pieces.

7. The attachment of claim 6, wherein said motor has two rotational speeds, one of said speeds being about 1½ times as fast as the other of said rotational speeds.

8. The attachment of claim 6, wherein each of said pieces has a bend portion positioned between said first and second ends such that said first and second ends of a particular piece are positioned at about a 90 degree angle from each other.

9. The attachment of claim 8, wherein each of said bend portions is curved.

10. A grill with attachment for supporting a spit, the grill comprising:
    a grill comprising a lower housing and a cooking grate being disposed on said lower housing;
    an annular spit mount having a pair of long pieces and a pair of short pieces positioned between said long pieces;
    each of said pieces having opposite first and second ends and a bend portion positioned between said first and second ends such that said first and second ends of a particular piece are positioned at about a 90 degree angle from each other, said first end of a piece removably engaging said second end of an adjacent piece;
    each of said bend portions being curved;
    each of said pieces having a first angled portion positioned towards said first end thereof and angling inward of said piece, said first angled portions each having a slot extending upwardly therealong;
    each of said pieces having a second angled portion positioned towards said second end thereof and angling inward of said piece, said second angled portions each having a slot extending downwardly therealong and adapted for receiving said first angled portion therein;
    a first of said short pieces having a slot downwardly extending from an upper edge of said short piece, said slot being adapted for receiving a spit therein;
    a second of said short pieces having a first aperture positioned towards an upper edge thereof and a holed mounting wall having a hole substantially aligned with said first aperture;
    a spit being inserted through said first aperture and said hole of said second of said short pieces and resting in said slot of said first of said short pieces;
    a pair of forks coupled to said spit for coupling food to said spit, said forks being selectively positionable along said spit;
    a motor for rotating said spit, said motor being mounted to said mounting wall of said second of said short pieces and being in communication with said spit;

said motor having two rotational speeds, one of said speeds being about 1½ times as fast as the other of said rotational speeds;

a lid resting on said spit mount, said lid having long sides and short sides; and said lid having a pair of side vent slots being positioned on said long sides of said lid towards a lower periphery of said lid, said lid having two pairs of end vent slots, a pair of end slots being positioned on each short side of said lid towards said lower periphery of said lid in a spaced apart configuration.

11. A grill attachment for supporting a spit, the attachment comprising:

an annular spit mount having a plurality of pieces, each of said pieces having opposite first and second ends, said first end of a piece removably engaging said second end of an adjacent piece;

a first of said pieces having a slot downwardly extending from an upper edge of said piece, said slot being adapted for receiving a spit therein;

a second of said pieces having a first aperture positioned towards an upper edge thereof, said first aperture being adapted for receiving a spit therethrough;

a spit being inserted through said first aperture of said second of said pieces and resting in said slot of said first of said pieces; and a pair of forks coupled to said spit for coupling food to said spit; and wherein each of said pieces has a bend portion positioned between said first and second ends such that said first and second ends of a particular piece are positioned at about a 90 degree angle from each other.

12. The attachment of claim 11, wherein said forks are selectively positionable along said spit.

13. The attachment of claim 11, wherein each of said bend portions is curved.

* * * * *